(12) United States Patent
Van Phan et al.

(10) Patent No.: US 9,814,094 B2
(45) Date of Patent: Nov. 7, 2017

(54) DEVICE-TO-DEVICE TRANSMISSION IN COMMUNICATIONS

(75) Inventors: Vinh Van Phan, Oulu (FI); Ling Yu, Oulu (FI); Kari Veikko Horneman, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 410 days.

(21) Appl. No.: 14/395,029

(22) PCT Filed: Apr. 17, 2012

(86) PCT No.: PCT/EP2012/056988
§ 371 (c)(1),
(2), (4) Date: Oct. 16, 2014

(87) PCT Pub. No.: WO2013/156056
PCT Pub. Date: Oct. 24, 2013

(65) Prior Publication Data
US 2015/0131475 A1  May 14, 2015

(51) Int. Cl.
*H04L 12/28* (2006.01)
*H04W 84/18* (2009.01)
*H04W 8/26* (2009.01)
*H04L 12/24* (2006.01)
*H04W 16/24* (2009.01)
*H04W 84/22* (2009.01)

(52) U.S. Cl.
CPC ......... *H04W 84/18* (2013.01); *H04L 41/0806* (2013.01); *H04W 8/26* (2013.01); *H04W 16/24* (2013.01); *H04W 84/22* (2013.01)

(58) Field of Classification Search
CPC ....... H04W 84/18; H04W 16/24; H04W 8/26; H04W 84/22; H04L 41/0806
See application file for complete search history.

(56) References Cited

U.S. PATENT DOCUMENTS

2004/0266440 A1* 12/2004 Fuchs ................ H04L 12/1836
455/445
2011/0268006 A1* 11/2011 Koskela ............. H04W 72/121
370/312

FOREIGN PATENT DOCUMENTS

WO    2012066433 A1    5/2012

OTHER PUBLICATIONS

International Search Report and Written Opinion for International Application No. PCT/EP2012/056988, dated Jan. 17, 2013, 16 pages.

(Continued)

*Primary Examiner* — Afshawn Towfighi
(74) *Attorney, Agent, or Firm* — Brake Hughes Bellermann LLP

(57) ABSTRACT

A method for providing an ad-hoc network provided, wherein at least one group of mobile devices operate as a device-to-device cluster having a currently elected cluster head device. The method comprises configuring, in a network apparatus for the device-to-device cluster, a cluster-specific cell-level radio network temporary identifier C-RNTI on the basis of a content-sharing service requested within the device-to-device cluster. C-RNTI is used to act as a cluster-specific virtual radio access user responsible for transmission between a serving base station and the currently elected cluster head device on behalf of the device-to-device cluster.

20 Claims, 5 Drawing Sheets

(56) References Cited

OTHER PUBLICATIONS

Timo Koskela, et al.; "Clustering Concept using Device-to-Device Communication in Cellular System"; Wireless Communications and Networking Conference (WCNC); 2010 IEEE, Apr. 18, 2010, pp. 1-6.

Jaakko Seppälä, et al.; Network Controlled Device-to-Device (D2D) and Cluster Multicast Concept for LTE and LTE-A Networks; Wireless Communications and Networking Conference (WCNC); 2011 IEEE, Mar. 28, 2011, pp. 986-991.

* cited by examiner

DEVICE-TO-DEVICE TRANSMISSION IN COMMUNICATIONS

This application is a national stage entry of PCT Application No. PCT/EP2012/056988, filed on Apr. 17, 2012, entitled "DEVICE-TO-DEVICE TRANSMISSION IN COMMUNICATIONS", which is hereby incorporated by reference in its entirety.

FIELD OF THE INVENTION

The exemplary and non-limiting embodiments of this invention relate generally to wireless communications networks, and more particularly to device-to-device transmission.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Multicast services are becoming more and more popular with the development of cellular wireless networks (e.g. LTE networks), where data is transmitted to multiple recipients by eNB. An interesting multicast retransmission solution is in-band cooperative retransmission where one of the users who have already successfully received a packet is responsible for retransmitting the packet to users who have reported a negative acknowledgement (NACK) before. Thus the recipients in a multicast service may form a cluster to help each other in service data receiving.

SUMMARY

The following presents a simplified summary of the invention in order to provide a basic understanding of some aspects of the invention. This summary is not an extensive over view of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, and a computer program product as defined in the independent claims. Further embodiments of the invention are disclosed in the dependent claims.

An aspect of the invention relates to a method for providing an ad-hoc network, wherein at least one group of mobile devices operating as a device-to-device cluster having a currently elected cluster head device, the method comprises configuring, in a network apparatus for the device-to-device cluster, a cluster-specific cell-level radio network temporary identifier C-RNTI on the basis of each content-sharing service requested within the device-to-device cluster, wherein the cluster-specific cell-level radio network temporary identifier C-RNTI acts as a cluster-specific virtual radio access user responsible for transmission between a serving base station and the currently elected cluster head device on behalf of the device-to-device cluster.

A further aspect of the invention relates to an apparatus comprising at least one processor; and at least one memory including a computer program code, wherein the at least one memory and the computer program code are configured to, with the at least one processor, cause the apparatus to, at least one group of mobile devices operating as a device-to-device cluster having a currently elected cluster head device, configure for the device-to-device cluster, a cluster-specific cell-level radio network temporary identifier C-RNTI on the basis of each content-sharing service requested within the device-to-device cluster, wherein the cluster-specific cell-level radio network temporary identifier C-RNTI acts as a cluster-specific virtual radio access user responsible for transmission between a serving base station and the currently elected cluster head device on behalf of the device-to-device cluster.

A still further aspect of the invention relates to a base station comprising at least one processor; and at least one memory including a computer program code, wherein the at least one memory and the computer program code are configured to, with the at least one processor, cause the base station to, at least one group of mobile devices operating as a device-to-device cluster having a currently elected cluster head device, configure for the device-to-device cluster, a cluster-specific cell-level radio network temporary identifier C-RNTI on the basis of each content-sharing service requested within the device-to-device cluster, wherein the cluster-specific cell-level radio network temporary identifier C-RNTI acts as a cluster-specific virtual radio access user responsible for transmission between a serving base station and the currently elected cluster head device on behalf of the device-to-device cluster.

A still further aspect of the invention relates to a computer program product comprising program code means adapted to perform any one of the method steps when the program is run on a computer.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
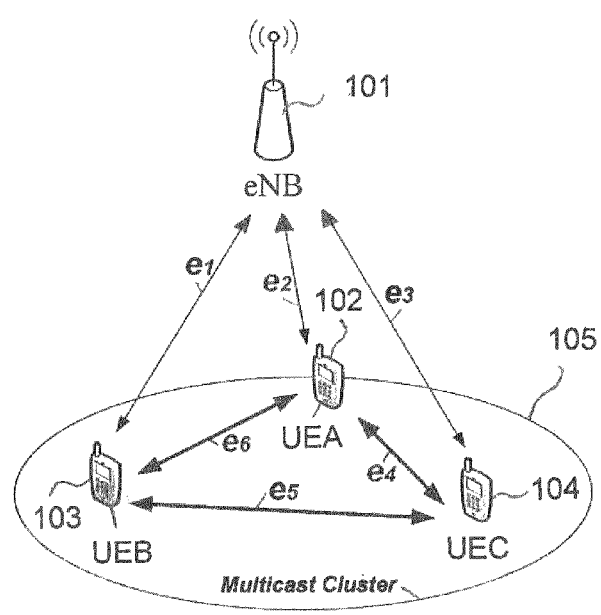
FIG. 1 shows a simplified block diagram illustrating exemplary system architecture.

An exemplary embodiment relates to a 3GPP LTE-A Rel-12 system, addressing an LTE-A support for network-controlled D2D communications. 3GPP TSG-SA1 is carrying out a study of services and requirements for D2D communications, referred to as proximity services (ProSe).

A potential ProSe use case is local content sharing in which a group of mobile devices involved in D2D communications, also referred to as a D2D cluster, are receiving and sharing the same on-line content—such as a multicast live event, film on-line or large multimedia file—which is being downloaded from an IP server or a remote user terminal via LTE/LTE-A cellular access primarily and using D2D communications for distribution of the shared content locally within the D2D cluster.

An exemplary embodiment considers selective and cooperative transmission schemes for efficient D2D based content sharing. This aims at (i) keeping the distribution of the shared content as local as possible to maximize energy efficiency and performance (not each cluster member but only some selected cluster members need to transmit/receive to/from eNB, and eNB needs to ensure correct packet transmissions, as required for the service, on a cluster-wise basis, and not for each and every individual member); and (ii) exploiting multiuser diversities, both selective (scheduled based on the best suitable user—suitable capability in the best condition/state—instead of the worst one as in regular multicast transmission) and combining (due to cooperation).

An existing solution which considers a use case of on-line content sharing, assume direct multicast transmission from eNB to each member of the D2D cluster with possible local HARQ retransmissions over D2D within the D2D cluster. Thus, each member needs to receive/transmit from/to eNB primarily, and D2D is utilized for retransmissions. After a first round of multicast from eNB, different UEs in the multicast cluster may have a different receiving status. For example, a service packet may be received correctly at one UE but incorrectly at another UE. When the multicast cluster members are located near to each other, intra-cluster retransmission may result in higher spectrum efficiency because the intra-cluster links are much better than the multicast cellular links. UEs in the cluster may deduct detailed control of a group of intra-cluster retransmissions based on packet size, retransmission priority of each UE, and/or an ACK/NACK table which is broadcast to the cluster members by eNB in advance. Each UE reports its newest ACK/NACK status of a packet group, wherein eNB dynamically notifies each UE in the cluster in a centralized manner, i.e. eNB provides an updated ACK/NACK table indicating the reception status of each service packet at each UE in the cluster.

In an exemplary embodiment, the D2D cluster may have a cluster head and at least one cluster-wise C-RNTI assigned which may be used for transmissions between a serving eNB and the D2D cluster. Thus an ad-hoc network is provided including a plurality of mobile nodes including at least one group of mobile nodes operating as a cluster with a currently elected cluster head node. Thus, not each UE in the D2D cluster needs to be kept in an RRC connected state, yet any UE of the D2D cluster may be able to receive/transmit from/to eNB on behalf of the cluster using the cluster-wise C-RNTI's.

In an exemplary embodiment, it is proposed to configure a cluster-wise C-RNTI for the D2D cluster of interest on the basis of each requested content-sharing service, referred to as a cluster-wise virtual radio access user. In an exemplary embodiment, it is also proposed to introduce a new class of radio access UE capabilities for the cluster-wise virtual user, as compared to that of regular UE capability classes. This cluster-wise virtual user may have extended radio access UE contexts, and the configuration thereof may be determined based on collective information of both cluster-wise information (population or size of the cluster, a number of selected members which transmit/receive to/from eNB on behalf of the cluster, reported cluster-wise measurements and statuses, cluster-wise service requirements, etc.) and information specific to individual members (UE capabilities, reported individual measurements and statuses, individual service requirements, etc.). There may be some new parameters or new value ranges of existing parameters in the extended radio access UE contexts and a UE capability class of the cluster-wise virtual user, as compared to that of a regular radio access UE. For example, D2D and cooperative transmission/reception related contexts and parameters may be introduced, and limits of a L1 transmit power budget, a number of HARQ processes or a L2 buffer size defined for different UE capability classes, etc. may be extended for cluster-wise collective use and operation (having some further distribution/resolution of allocated resource/task pools/budgets onto selected members).

In an exemplary embodiment, eNB and the cluster head (CH) may negotiate and agree upon capability configurations and allocations for the cluster-wise virtual user. eNB may schedule transmissions of the cluster's content sharing service on the cluster-wise C-RNTI for both DL and UL, either with dynamic allocation or semi-persistent allocation. The cluster-wise virtual user therefore may have each associated physical control channel and default/dedicated radio bearer services configured, as a regular user in the RRC connected state.

In an exemplary embodiment, CH is responsible for selecting and allocating its members for necessary receptions/transmissions between the cluster and eNB which are scheduled for the cluster-wise C-RNTI (and also within the cluster). The selection may be based on e.g. a cellular-access state, channel condition, battery status, service demand/requirement, resource allocation, device capability, etc., of individual members (made available at CH by either direct report/indication updated from individual members or indication updated from the network) evaluated against the cluster size, traffic demand, and that of the virtual cluster-wise user configured so as to optimize selective gain with best suitable members selected. The selected members may be either RRC-connected or RRC-idle users. The network (the serving eNB) may assist CH in selecting RRC-connected members by providing recommendations or inputs for decision making to CH such as context information and resource allocation information on the RRC connected members. Optionally the cluster head may inform eNB about the selection outcomes, such as C-RNTIs of the selected RRC connected members. This allows eNB and the cluster to communicate via those individual members' allocation and C-RNTI, in addition to or instead of that allocated for the group-wise C-RNTI. The allocation includes distributing/dedicating HARQ processes from the configured collective pool to the selected members to receive/transmit for the cluster (i) so as to allow a sufficient time for local D2D distribution of a received HARQ transport block (TB), and (ii) so as to optimize combining gain in cooperative distribution of shared content. This takes into account that a selected member may have other ongoing services of its own and, therefore, limited local device resource and capability left. In this regard, a selected member may be allowed to negotiate with CH about its commitment to the aforementioned selection and allocation which may trigger a reselection or a reallocation.

In an exemplary embodiment, the serving eNB is responsible for the selection and allocation described above, considering only the RRC-connected members.

In an exemplary embodiment, the following HARQ operation options are made configurable by the network. In case that the number of HARQ processes in the configured collective pool is large enough so that HARQ round trip time (RTT) may be long enough for needed local D2D interaction and decision, a cluster-wise common HARQ acknowledgement may be configured to be fed back to eNB. In that case, those members which are selected to receive HARQ TB scheduled for the cluster-wise C-RNTI from the serving eNB, inform CH of individual HARQ ACK/NACK over D2D links, and CH then determines the cluster-wise common HARQ acknowledgement and selects the members to send it to eNB using corresponding UL channel (PUCCH) allocated to the cluster-wise C-RNTI. For instance, depending on the configured tolerable packet error rate of the service, the number of members in the cluster, and so forth, CH may be configured to determine ACK for the cluster-wise common HARQ acknowledgement to be sent to eNB if at least one or a configured minimum number of those selected members receives the scheduled TB correctly from eNB, or NACK otherwise. Furthermore, the allocated power budget for sending a cluster-wise common HARQ acknowledgement on a PUCCH resource allocated to the cluster-wise C-RNTI may be distributed and adjusted among the selected members by CH. In case that the number of available HARQ processes for cluster-wise virtual user is limited, HARQ acknowledgement may be configured to be transmitted in a corresponding UL channel (PUCCH) to eNB individually by those members which are selected to receive HARQ TB. In that case, only ACK is fed back to eNB by individual members that receive TB correctly, in order to avoid confusion of ACK and NACK if the HARQ feedback is different from different members. It should be noted that eNB may receive the same ACK or even the same PUCCH allocated to the cluster-wise C-RNTI from more than one member in synchronization which enhances the reception at eNB.

It should be noted that the configured UE contexts of the cluster-wise virtual user are tied to that of CH, regarding the operation, maintenance and mobility management of the cluster for the requested service. This means that a reconfiguration, change or handover of the cluster-wise virtual user is triggered and performed along with such corresponding procedure needed for CH. Thus, most if not all higher-layer control signalling for the cluster-wise virtual user may be embedded or multiplexed into corresponding control signalling procedures designated for the user acting as the cluster head.

Thus, an exemplary embodiment facilitates efficient selective and cooperative transmissions for D2D-based content sharing, where D2D may be utilized for transport-block distributions.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support D2D signalling. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (long term evolution) network elements, without restricting the embodiment to such an architecture, however. The embodiments described in these examples are not limited to the LTE radio systems but can also be implemented in other radio systems, such as UMTS (universal mobile telecommunications system), LTE-A, GSM, EDGE, WCDMA, bluetooth network, WLAN or other fixed, mobile or wireless network. In an embodiment, the presented solution may be applied between elements belonging to different but compatible systems such as LTE and UMTS.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 1 comprises a network node 101 of a network operator. The network node 101 may include e.g. an LTE (and/or LTE-A) base station (eNB), base transceiver station (BS, BTS), access point (AP), radio network controller (RNC), mobile switching centre (MSC), MSC server (MSS), mobility management entity (MME), gateway GPRS sup-port node (GGSN), serving GPRS support node (SGSN), home location register (HLR), home subscriber server (HSS), visitor location register (VLR), or any other network element, or a combination of network elements. The network node 101 may be connected to one or more further network elements via an interface (not shown in FIG. 1). In FIG. 1, the radio network node 101 that may also be called eNB (enhanced node-B, evolved node-B) of the radio sys-tem hosts the functions for radio resource management in a public land mobile network. FIG. 1 shows one or more user equipment 102, 103, 104 located in the service area of the radio network node 101. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 1, the user equipment 102, 103, 104 is capable of connecting to the radio network node 101 respectively via a connection e2, e1, e3. In the example situation of FIG. 1, the user equipment 102 (UEA) is capable of connecting to the user equipment 103 (UEB) via a connection e6, and to the user equipment 104 (UEC) via a connection e4. The user equipment 103 (UEB) is capable of connecting to the user equipment 104 (UEC) via a connection e5. The apparatuses 101, 102, 103 and 104 thus form an ad-hoc network where a group of mobile devices (e.g. the user equipment 102, 103, 104) are capable of operating as a device-to-device (D2D) multicast cluster 105 which may have a currently elected cluster head device (e.g. the user equipment 102).

Figure 2:
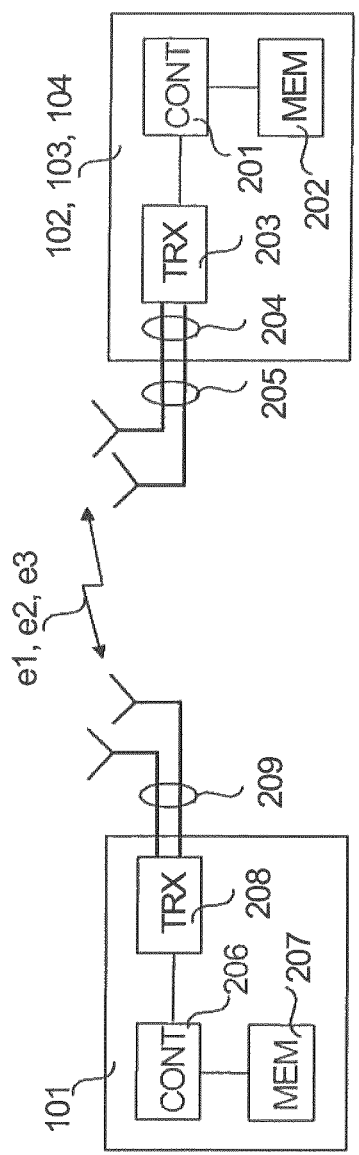
FIG. 2 shows a simplified block diagram illustrating exemplary apparatuses.

FIG. 2 is a block diagram of an apparatus according to an embodiment of the invention. FIG. 2 shows a user equipment 102, 103, 104 located in the area of a radio network node 101. The user equipment 102, 103, 104 is configured to be in connection with the radio network node 101. The user equipment or UEA, UEB, UEC comprises a controller 201 operationally connected to a memory 202 and a transceiver 203. The controller 201 controls the operation of the user equipment 102, 103, 104. The memory 102 is configured to store software and data. The transceiver 203 is configured to set up and maintain a wireless connection e2, e1, e3 to the radio network node 101. The transceiver 203 is operationally connected to a set of antenna ports 204 connected to an antenna arrangement 205. The antenna arrangement 205 may comprise a set of antennas. The number of antennas may be one to four, for example. The number of antennas is not limited to any particular number. The user equipment 102, 103, 104 may also comprise various other components, such as a user interface, camera, and media player. They are not displayed in the figure due to simplicity. The radio network node 101, such as an LTE (LTE-A) base station (eNode-B, eNB) or access point (AP), comprises a controller 206 operationally connected to a memory 207, and a transceiver 208. The controller 206 controls the operation of the radio network node 201. The memory 207 is configured to store software and data. The transceiver 208 is configured to set up and maintain a wireless connection to the user equipment 102, 103, 104 within the service area of the radio network node 101. The transceiver 808 is operationally connected to an antenna arrangement 209. The antenna arrangement 209 may comprise a set of antennas. The number of antennas may be two to four, for example. The number of antennas is not limited to any particular number. The radio network node 101 may be operationally connected (directly or indirectly) to another network element (not shown in FIG. 2) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 101, 102, 103, 104 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 101, 102, 103, 104 may generally include a processor, controller, control unit or the like connected to a memory and to various interfaces of the apparatus. Generally the processor is a central processing unit, but the processor may be an additional operation processor. The processor may com-prise a computer processor, application-specific integrated circuit (ASIC), field-programmable gate array (FPGA), and/or other hardware components that have been programmed in such a way to carry out one or more functions of an embodiment.

The memory 202, 207 may include volatile and/or non-volatile memory and typically stores content, data, or the like. For example, the memory 202, 207 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 3:
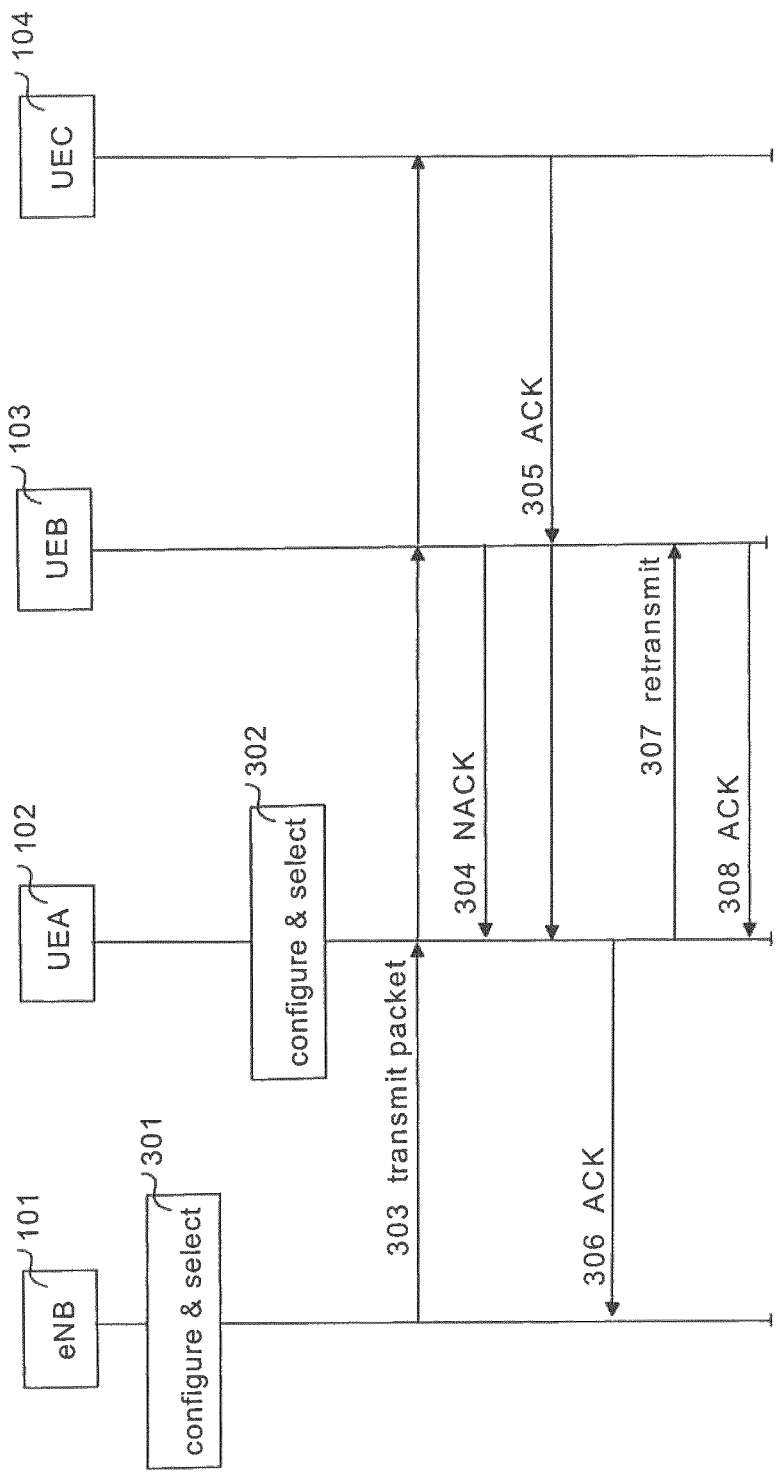
FIG. 3 shows a messaging diagram illustrating an exemplary messaging event according to an embodiment of the invention.

The signalling chart of FIG. 3 illustrates the required signalling. In the example of FIG. 3, a network apparatus 101 (which may comprise e.g. an LTE-capable (and/or LTE-A-capable) base station (eNode-B) or a WLAN access point (AP)) configures, in item 301, for a D2D multicast cluster 105, a cluster-specific cell-level radio network temporary identifier C-RNTI and a cluster-specific virtual radio access user thereof, in response to a content-sharing service request being received from a member (i.e. mobile device 102, 103, 104) of the D2D multicast cluster 105. Further, in item 301, eNB 101 selects user terminals, e.g. UEB 103 and UEC 104, to receive TB or a packet scheduled for the configured cluster-specific C-RNTI from eNB, on behalf of the cluster. Another option is that, in item 302, a user terminal 102 (instead of eNB) configures, for the D2D multicast cluster 105, the cluster-specific cell-level radio network temporary identifier C-RNTI and a cluster-specific virtual radio access user thereof, in response to a content-sharing service request being received from a member (i.e. mobile device 102, 103, 104) of the D2D multicast cluster 105 (in this option the cluster head 102 may be configured to notify (not shown in FIG. 3) the serving base station 101 of the configured C-RNTI for the multicast cluster). C-RNTI then acts as a cluster-specific virtual radio access user responsible for transmission between the serving base station 101 and a currently elected cluster head device (e.g. UEA 102) on behalf of the D2D multicast cluster 105. In that case, in item 302, CH 102 further selects user terminals, e.g. UEB 103 and UEC 104, to receive TB or a packet scheduled for the configured cluster-specific C-RNTI from eNB, on behalf of the cluster. In item 303, the network apparatus 101 transmits a data packet (i.e. content-sharing service) to at least one network node 102, 103, 104 (which may comprise e.g. a user terminal) by using the respective multicast-cluster-specific C-RNTI. In the exemplary situation of FIG. 3, the user terminal 103 (i.e. UEB) transmits, in item 304, a negative acknowledgement (NACK) to UEA 102, and the user terminal 104 (i.e. UEC) transmits, in item 305, a (positive) acknowledgement (ACK) to UEA 102. This indicates to the elected cluster head 102 that UEB 103 received the packet (or TB) incorrectly and UEC 104 received the packet correctly. In item 306, the cluster head sends a (positive) acknowledgement (ACK) to eNB 101. In item 307, the cluster head 102 is configured to retransmit the packet (or TB) to those cluster members that did not receive the packet correctly, i.e. in this case to UEB 103. In item 307, UEB 103 may respond with ACK to UEA 102 indicating to the elected cluster head 102 that UEB 103 received the retransmitted packet (or TB) correctly.

Figure 4:
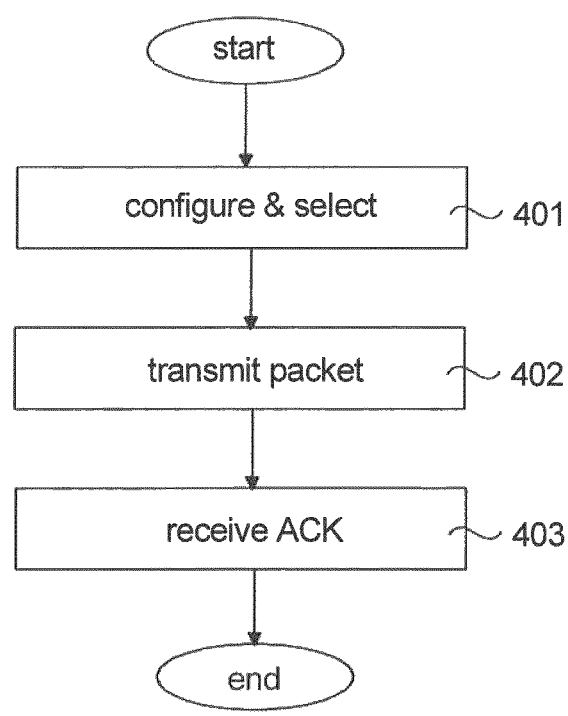
FIG. 4 shows a schematic diagram of a flow chart according to an exemplary embodiment of the invention.

FIG. 4 is a flow chart illustrating an exemplary embodiment. The apparatus 101, which may comprise e.g. an LTE-capable (and/or LTE-A-capable) base station (eNode-B, eNB) or WLAN access point (AP), configures, in item 401, for a D2D multicast cluster 105, a cluster-specific cell-level radio network temporary identifier C-RNTI as a cluster-specific virtual radio access user in response to a content-sharing service request being received from a member (i.e. mobile device 102, 103, 104) of the D2D multicast cluster 105. Another option is that a user terminal 102 (instead of eNB) configures, for the D2D multicast cluster 105, the cluster-specific cell-level radio network temporary identifier C-RNTI as a cluster-specific virtual radio access user in response to a content-sharing service request being received from a member (i.e. mobile device 102, 103, 104) of the D2D multicast cluster 105 (in this option the serving base station 101 may receive notification (not shown in FIG. 4) of the configured C-RNTI for the multicast cluster from the cluster head 102). C-RNTI acts as a cluster-specific virtual radio access user responsible for transmission between the serving base station 101 and a currently elected cluster head device (e.g. UEA 102) on behalf of the D2D multicast cluster 105. Further, in item 401, eNB 101 selects user terminals, e.g. UEB 103 and UEC 104, to receive a transport block or a packet scheduled for the configured cluster-specific C-RNTI from eNB, on behalf of the cluster. In item 402, the network apparatus 101 transmits a data packet (i.e. content-sharing service) to at least one network node 102, 103, 104 (which may comprise e.g. a user terminal) by using the respective cluster-specific C-RNTI. In the exemplary situation of FIG. 4, a corresponding (positive) acknowledgement (ACK) is received in eNB 101 from the cluster head 102 in item 403.

Figure 5:
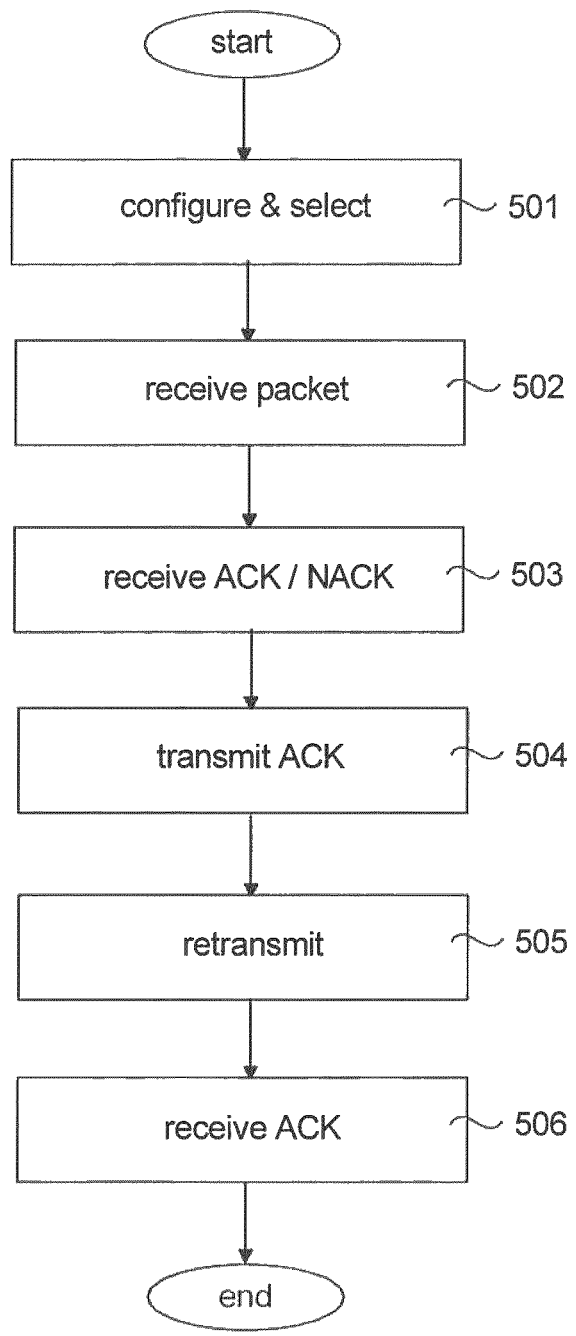
FIG. 5 shows a schematic diagram of a flow chart according to another exemplary embodiment of the invention.

FIG. 5 is a flow chart illustrating an exemplary embodiment. The apparatus 102, 103, 104, which may comprise e.g. a network element (network node, e.g. a user terminal, UE) configures, in item 501, for a D2D multicast cluster 105, a cluster-specific cell-level radio network temporary identifier C-RNTI as a cluster-specific virtual radio access user in response to a content-sharing service request being received from a member (i.e. mobile device 102, 103, 104) of the D2D multicast cluster 105. Another option is that, a base station 101 configures, for the D2D multicast cluster 105, the cluster-specific cell-level radio network temporary identifier C-RNTI as a cluster-specific virtual radio access user in response to a content-sharing service request being received from a member (i.e. mobile device 102, 103, 104) of the D2D multicast cluster 105 (in this option the cluster head 102 may be configured to receive (not shown in FIG. 5) from the serving base station 101 a notification of the configured C-RNTI for the multicast cluster). C-RNTI acts as a cluster-specific virtual radio access user responsible for transmission between the serving base station 101 and a currently elected cluster head device (e.g. UEA 102) on behalf of the D2D multicast cluster 105. In item 502, the user terminal 102, 103, 104 receives a data packet (i.e. content-sharing service) transmitted from a further apparatus (e.g. LTE-capable (or LTE-A-capable) base station (eNode-B, eNB) or WLAN access point (AP)) 101 by using the respective cluster-specific C-RNTI. In the exemplary situation of FIG. 5, the user terminal 102 (i.e. UEA) receives, in item 503, for example, a negative acknowledgement (NACK) from UEB 103, and a (positive) acknowledgement (ACK) from UEC 104. This indicates to the elected cluster head 102 that UEB 103 received the packet incorrectly and UEC 104 received the packet correctly. In item 504, the cluster head sends a (positive) acknowledgement (ACK) to eNB 101. In item 505, the cluster head 102 is configured to retransmit the packet to those cluster members that did not receive the packet correctly, i.e. in this case to UEB 103. In item 506, an ACK may be received from UEB 103.

It should be noted that in an exemplary embodiment, UEC (or UEB) may send ACK directly to eNB (and not to CH). ACK is thus not necessarily received at eNB from CH but from any selected member(s) of the cluster. An exemplary embodiment enables a situation where UEB (or UEC) skips sending NACK to eNB (instead NACK is sent to CH).

It should further be noted that an exemplary embodiment is not limited to a D2D multicast cluster. Instead, an exemplary embodiment is applicable to a unicast D2D cluster as well.

It should further be noted that the cluster may be formed for the requested service in any suitable way and its form is not limited to those described above.

The steps/points, signalling messages and related functions de-scribed above in FIGS. 1 to 5 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for providing an ad-hoc network, wherein at least one group of mobile devices operating as a device-to-device cluster having a currently elected cluster head device, the method comprises configuring, in a network apparatus for the device-to-device cluster, a cluster-specific cell-level radio network temporary identifier C-RNTI on the basis of each content-sharing service requested within the device-to-device cluster, wherein the cluster-specific cell-level radio network temporary identifier C-RNTI acts as a cluster-specific virtual radio access user responsible for transmission between a serving base station and the currently elected cluster head device on behalf of the device-to-device cluster.

According to another exemplary embodiment, the cluster-specific cell-level radio network temporary identifier C-RNTI is used for transmission between the serving base station and the mobile devices in the device-to-device cluster.

According to yet another exemplary embodiment, one or more mobile devices in the device-to-device cluster are able to receive from/transmit to the serving base station on behalf of the device-to-device cluster by using the cluster-specific cell-level radio network temporary identifier C-RNTI.

According to yet another exemplary embodiment, there is provided a method for defining a capability class for radio access mobile device capabilities of the cluster-specific virtual radio access user, including extended radio access mobile device contexts, wherein the configuration the contexts is determined based on cluster-specific information and member-specific information.

According to yet another exemplary embodiment, the cluster-specific information comprises one or more of population of the cluster, size of the cluster, a number of selected members able to transmit/receive to/from the base station on behalf of the cluster, reported cluster-specific measurements, reported cluster-specific statuses, and cluster-specific service requirements; the member-specific information comprises one or more of mobile device capabilities, reported individual measurements, reported individual statuses, and individual service requirements.

According to yet another exemplary embodiment, there is provided a method for negotiating, between the cluster head device and the base station, a capability configuration and allocation for the cluster-specific virtual radio access user, wherein the transmissions of the cluster's content-sharing service are scheduled by the base station on the cluster-specific cell-level radio network temporary identifier C-RNTI for downlink and uplink, by using dynamic allocation or semi-persistent allocation.

According to yet another exemplary embodiment, the cluster head device is responsible for selecting and allocating the members of the cluster for necessary receptions and/or transmissions between the cluster and the base station, which receptions and/or transmissions are scheduled for the cluster-specific cell-level radio network temporary identifier C-RNTI and within the cluster.

According to yet another exemplary embodiment, the selecting is based on one or more of the following characteristics of an individual member of the cluster: a cellular access state, channel condition, battery status, service demand, service requirement, resource allocation, and device capability, wherein said one or more characteristics is evaluated against a cluster size, traffic demand, and characteristics of the cluster-specific virtual radio access user so as to optimize selective gain with best suitable members selected.

According to yet another exemplary embodiment, said one or more characteristics of the individual member of the cluster is made available at the cluster head device by a direct indication from the individual member or by an indication from the network.

According to yet another exemplary embodiment, the selected members of the cluster are RRC-connected mobile devices or RRC-idle mobile devices.

According to yet another exemplary embodiment, the cluster head device is assisted by the serving base station in selecting the RRC-connected cluster members such that the cluster head device receives, from the serving base station, recommendations and/or inputs for decision making, such as context information and resource allocation information on the RRC-connected cluster members.

According to yet another exemplary embodiment, the cluster head device informs the serving base station on the cell-level radio network temporary identifiers C-RNTI of the selected RRC-connected cluster members.

According to yet another exemplary embodiment, the allocating including distributing and dedicating HARQ processes from a configured collective pool to the selected cluster members in order them to be able to receive and transmit for the cluster.

According to yet another exemplary embodiment, in case the number of HARQ processes in the configured collective pool is large enough so that HARQ RTT is long enough for local device-to-device interaction and decision needed, a cluster-specific common HARQ acknowledgement is configured to be fed back to the serving base station, wherein cluster members which are selected to receive HARQ TB scheduled for the cluster-specific cell-level radio network temporary identifiers C-RNTI inform the cluster head device on an individual HARQ ACK/NACK, and the cluster head device then determines the cluster-specific common HARQ acknowledgement and selects the cluster members that are to send the cluster-specific common HARQ acknowledgement to the eNB, wherein allocated power budget for sending a HARQ acknowledgement is distributed and adjusted among the selected cluster members by the cluster head device.

According to yet another exemplary embodiment, in case that the number of available HARQ processes for the cluster-specific virtual radio access user is limited, a HARQ acknowledgement is configured to be transmitted in uplink individually by cluster members which are selected to receive HARQ TB, wherein only ACK is fed back to the serving base station by individual cluster members.

According to yet another exemplary embodiment, there is provided an apparatus comprising at least one processor; and at least one memory including a computer program code, wherein the at least one memory and the computer program code are configured to, with the at least one processor, cause the apparatus to, at least one group of mobile devices operating as a device-to-device cluster having a currently elected cluster head device, configure for the device-to-device cluster, a cluster-specific cell-level radio network temporary identifier C-RNTI on the basis of each content-sharing service requested within the device-to-device cluster, wherein the cluster-specific cell-level radio network temporary identifier C-RNTI acts as a cluster-specific virtual radio access user responsible for transmission between a serving base station and the currently elected cluster head device on behalf of the device-to-device cluster.

According to yet another exemplary embodiment, the at least one memory and the computer program code are configured to, with the at least one processor, cause the apparatus to use the cluster-specific cell-level radio network temporary identifier C-RNTI for transmission between the serving base station and the mobile devices in the device-to-device cluster.

According to yet another exemplary embodiment, the at least one memory and the computer program code are configured to, with the at least one processor, cause the apparatus to receive from/transmit to the serving base station on behalf of the device-to-device cluster by using the cluster-specific cell-level radio network temporary identifier C-RNTI.

According to yet another exemplary embodiment, the at least one memory and the computer program code are configured to, with the at least one processor, cause the apparatus to define a capability class for radio access mobile device capabilities of the cluster-specific virtual radio access user, including extended radio access mobile device contexts, wherein the configuration the contexts is determined based on cluster-specific information and member-specific information.

According to yet another exemplary embodiment, the cluster-specific information comprises one or more of population of the cluster, size of the cluster, a number of selected members able to transmit/receive to/from the base station on behalf of the cluster, reported cluster-specific measurements, reported cluster-specific statuses, and cluster-specific service requirements; the member-specific information comprises one or more of mobile device capabilities, reported individual measurements, reported individual statuses, and individual service requirements.

According to yet another exemplary embodiment, the at least one memory and the computer program code are configured to, with the at least one processor, cause the apparatus to negotiate, between the cluster head device and the base station, a capability configuration and allocation for the cluster-specific virtual radio access user, wherein the transmissions of the cluster's content-sharing service are scheduled by the base station on the cluster-specific cell-level radio network temporary identifier C-RNTI for downlink and uplink, by using dynamic allocation or semi-persistent allocation.

According to yet another exemplary embodiment, the cluster head device is responsible for selecting and allocating the members of the cluster for necessary receptions and/or transmissions between the cluster and the base station, which receptions and/or transmissions are scheduled for the cluster-specific cell-level radio network temporary identifier C-RNTI and within the cluster.

According to yet another exemplary embodiment, the at least one memory and the computer program code are configured to, with the at least one processor, cause the apparatus to perform the selecting based on one or more of the following characteristics of an individual member of the cluster: a cellular access state, channel condition, battery status, service demand, service requirement, resource allocation, and device capability, wherein said one or more characteristics are evaluated against a cluster size, traffic demand, and characteristics of the cluster-specific virtual radio access user so as to optimize selective gain with best suitable members selected.

According to yet another exemplary embodiment, the at least one memory and the computer program code are configured to, with the at least one processor, cause the apparatus to make said one or more characteristics of the individual member of the cluster available at the cluster head device by a direct indication from the individual member or by an indication from the network.

According to yet another exemplary embodiment, the selected members of the cluster are RRC-connected mobile devices or RRC-idle mobile devices.

According to yet another exemplary embodiment, the at least one memory and the computer program code are configured to, with the at least one processor, cause the apparatus to be assisted by the serving base station in selecting the RRC-connected cluster members such that the cluster head device receives, from the serving base station, recommendations and/or inputs for decision making, such as context information and resource allocation information on the RRC-connected cluster members.

According to yet another exemplary embodiment, the at least one memory and the computer program code are configured to, with the at least one processor, cause the apparatus to inform the serving base station on the cell-level radio network temporary identifiers C-RNTI of the selected RRC-connected cluster members.

According to yet another exemplary embodiment, the at least one memory and the computer program code are configured to, with the at least one processor, cause the apparatus to perform the allocating by distributing and dedicating HARQ processes from a configured collective pool to the selected cluster members in order them to be able to receive and transmit for the cluster.

According to yet another exemplary embodiment, the at least one memory and the computer program code are configured to, with the at least one processor, cause the apparatus to configure, in case the number of HARQ processes in the configured collective pool is large enough so that HARQ RTT is long enough for local device-to-device interaction and decision needed, a cluster-specific common HARQ acknowledgement to be fed back to the serving base station, wherein cluster members which are selected to receive HARQ TB scheduled for the cluster-specific cell-level radio network temporary identifiers C-RNTI inform the cluster head device on an individual HARQ ACK/NACK, and the cluster head device them determines the cluster-specific common HARQ acknowledgement and selects the cluster members that are to send the cluster-specific common HARQ acknowledgement to the eNB, wherein allocated power budget for sending a HARQ acknowledgement is distributed and adjusted among the selected cluster members by the cluster head device.

According to yet another exemplary embodiment, the at least one memory and the computer program code are configured to, with the at least one processor, cause the apparatus to configure, in case that the number of available HARQ processes for the cluster-specific virtual radio access user is limited, a HARQ acknowledgement to be transmitted in uplink individually by cluster members which are selected to receive HARQ TB, wherein only ACK is fed back to the serving base station by individual cluster members.

According to yet another exemplary embodiment, there is provided a base station comprising at least one processor; and at least one memory including a computer program code, wherein the at least one memory and the computer program code are configured to, with the at least one processor, cause the base station to, at least one group of mobile devices operating as a device-to-device cluster having a currently elected cluster head device, configure for the device-to-device cluster, a cluster-specific cell-level radio network temporary identifier C-RNTI on the basis of each content-sharing service requested within the device-to-device cluster, wherein the cluster-specific cell-level radio network temporary identifier C-RNTI acts as a cluster-specific virtual radio access user responsible for transmission between a serving base station and the currently elected cluster head device on behalf of the device-to-device cluster.

According to yet another exemplary embodiment, the at least one memory and the computer program code are configured to, with the at least one processor, cause the base station to perform a cluster-level ensuring of correct packet transmissions as required for the content-sharing service.

According to yet another exemplary embodiment, the base station is responsible for selecting and allocating RRC-connected cluster members for necessary receptions and/or transmissions between the cluster and the base station, which receptions and/or transmissions are scheduled for the cluster-specific cell-level radio network temporary identifier C-RNTI and within the cluster.

According to yet another exemplary embodiment, the at least one memory and the computer program code are configured to, with the at least one processor, cause the base station to perform the selecting based on one or more of the following characteristics of an individual member of the cluster: a cellular access state, channel condition, battery status, service demand, service requirement, resource allocation, and device capability, wherein said one or more characteristics are evaluated against a cluster size, traffic demand, and characteristics of the cluster-specific virtual radio access user so as to optimize selective gain with best suitable members selected.

According to yet another exemplary embodiment, the at least one memory and the computer program code are configured to, with the at least one processor, cause the base station to make said one or more characteristics of the individual member of the cluster available at the cluster head device.

According to yet another exemplary embodiment, the at least one memory and the computer program code are configured to, with the at least one processor, cause the base station to assist in selecting RRC-connected cluster members by transmitting to the cluster head device recommendations and/or inputs for decision making, such as context information and resource allocation information on the RRC-connected cluster members.

According to yet another exemplary embodiment, the at least one memory and the computer program code are configured to, with the at least one processor, cause the base station to receive information on the cell-level radio network temporary identifiers C-RNTI of the selected RRC-connected cluster members.

According to yet another exemplary embodiment, the at least one memory and the computer program code are configured to, with the at least one processor, cause the base station to perform the allocating by distributing and dedicating HARQ processes from a configured collective pool to the selected cluster members in order them to be able to receive and transmit for the cluster.

According to yet another exemplary embodiment, there is provided a computer program product comprising program code means adapted to perform any one of the method steps when the program is run on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

C-RNTI cell-level radio network temporary identifier
D2D device-to-device
ProSe proximity service
ACK acknowledgement
NACK negative acknowledgement
HARQ hybrid automatic repeat request
eNB enhanced node-B
UE user equipment
CH cluster head
PUCCH physical uplink control channel
TB transport block
RRC radio resource control
L1 layer-1
L2 layer-2
DL downlink
UL uplink
LTE long term evolution
LTE-A advanced long term evolution
IP internet protocol
3GPP third generation partnership project
Rel-12 release-12
UMTS universal mobile telecommunications system
GSM global system for mobile communications
EDGE enhanced data rates for GSM evolution
WCDMA wideband code division multiple access
WLAN wireless local area network
RTT round trip time

The invention claimed is:

1. A method for providing an ad-hoc network, wherein at least one group of mobile devices operating as a device-to-device cluster having a currently elected cluster head device, the method comprising:
configuring, in a network apparatus for the device-to-device cluster, a cluster-specific cell-level radio network temporary identifier C-RNTI on the basis a content-sharing service request being received from a device within the device-to-device cluster, wherein the cluster-specific cell-level radio network temporary identifier C-RNTI is used to identify the device-to-device cluster as a virtual radio access user responsible for transmission between a serving base station and the currently elected cluster head device on behalf of the device-to-device cluster.

2. A method as claimed in claim 1, wherein the cluster-specific cell-level radio network temporary identifier C-RNTI is used for transmission between the serving base station and the mobile devices in the device-to-device cluster.

3. A method as claimed in claim 1, further comprising:
receiving, by one or more mobile devices in the device-to-device cluster, from the serving base station on behalf of the device-to-device cluster by using the cluster-specific cell-level radio network temporary identifier C-RNTI.

4. A method as claimed in claim 1, further comprising:
transmitting, by one or more mobile devices in the device-to-device cluster, to the serving base station on behalf of the device-to-device cluster by using the cluster-specific cell-level radio network temporary identifier C-RNTI.

5. A method as claimed in claim 1, wherein:
a capability class is defined for radio access mobile device capabilities of the cluster-specific virtual radio access user,
the capability class indicates extended radio access mobile device contexts, and
a configuration of the extended radio access mobile device contexts is determined based on cluster-specific information and member-specific information.

6. A method as claimed in claim 5, wherein the cluster-specific information comprises one or more of population of the cluster, size of the cluster, a number of selected members able to transmit/receive to/from the base station on behalf of the cluster, reported cluster-specific measurements, reported cluster-specific statuses, and cluster-specific service requirements; and wherein the member-specific information comprises one or more of mobile device capabilities, reported individual measurements, reported individual statuses, and individual service requirements.

7. A method as claimed in claim 1, and further comprising:

negotiating, between the cluster head device and the base station, a capability configuration and allocation for the cluster-specific virtual radio access user, wherein the transmissions of the cluster's content-sharing service are scheduled by the base station on the cluster-specific cell-level radio network temporary identifier C-RNTI for downlink and uplink, by using dynamic allocation or semi-persistent allocation.

8. A method as claimed claim 1, further comprising:

selecting and allocating, by the cluster head device, the members of the cluster for necessary receptions and/or transmissions between the cluster and the base station, which receptions and/or transmissions are scheduled for the cluster-specific cell-level radio network temporary identifier C-RNTI and within the cluster.

9. A method as claimed in claim 8, wherein the selecting is based on one or more of the following characteristics of an individual member of the cluster: a cellular access state, channel condition, battery status, service demand, service requirement, resource allocation, and device capability, wherein said one or more characteristics is evaluated against a cluster size, traffic demand, and characteristics of the cluster-specific virtual radio access user so as to optimize selective gain with best suitable members selected.

10. A method as claimed in claim 9, wherein the one or more characteristics of the individual member of the cluster is made available at the cluster head device by a direct indication from the individual member or by an indication from the network.

11. A method as claimed in claim 8, wherein the selected members of the cluster are RRC-connected mobile devices or RRC-idle mobile devices.

12. A method as claimed in claim 11, wherein the cluster head device is assisted by the serving base station in selecting the RRC-connected cluster members such that the cluster head device receives, from the serving base station, recommendations and/or inputs for decision making, such as context information and resource allocation information on the RRC-connected cluster members.

13. A method as claimed in claim 11, and further comprising the cluster head device informing the serving base station on the cell-level radio network temporary identifiers C-RNTI of the selected RRC-connected cluster members.

14. A method as claimed in claim 8, wherein the allocating including distributing and dedicating HARQ processes from a configured collective pool to the selected cluster members in order for them to be able to receive and transmit for the cluster.

15. A method as claimed in claim 14, wherein in case the number of HARQ processes in the configured collective pool is large enough so that HARQ RTT is long enough for local device-to-device interaction and decision needed, a cluster-specific common HARQ acknowledgement is configured to be fed back to the serving base station, wherein cluster members which are selected to receive HARQ TB scheduled for the cluster-specific cell-level radio network temporary identifiers C-RNTI inform the cluster head device on an individual HARQ ACK/NACK, and the cluster head device then determines the cluster-specific common HARQ acknowledgement and selects the cluster members that are to send the cluster-specific common HARQ acknowledgement to the base station, wherein allocated power budget for sending a HARQ acknowledgement is distributed and adjusted among the selected cluster members by the cluster head device.

16. A method as claimed in claim 14, wherein in case in which a number of available HARQ processes for the cluster-specific virtual radio access user is limited, a HARQ acknowledgement is configured to be transmitted in uplink individually by cluster members which are selected to receive HARQ TB, wherein only ACK is fed back to the serving base station by individual cluster members.

17. An apparatus, provided within at least one group of mobile devices operating as a device-to-device cluster having a currently elected cluster head device, the apparatus comprising:

at least one processor; and at least one memory including a computer program code; wherein the at least one memory and the computer program code are configured to, with the at least one processor, cause the apparatus to:

configure for the device-to-device cluster, a cluster-specific cell-level radio network temporary identifier C-RNTI on the basis a content-sharing service request being received from a device within the device-to-device cluster, wherein the cluster-specific cell-level radio network temporary identifier C-RNTI is used to identify the device-to-device cluster as a virtual radio access user responsible for transmission between a serving base station and the currently elected cluster head device (102) on behalf of the device-to-device cluster.

18. An apparatus as claimed in claim 17, wherein the cluster head device is configured to select and allocate the members of the cluster for necessary receptions and/or transmissions between the cluster and the base station, which receptions and/or transmissions are scheduled for the cluster-specific cell-level radio network temporary identifier C-RNTI and within the cluster.

19. An apparatus as claimed in claim 18, wherein the at least one memory and the computer program code are configured to, with the at least one processor, cause the apparatus to perform the allocating by distributing and dedicating HARQ processes from a configured collective pool to the selected cluster members in order for them to be able to receive and transmit for the cluster.

20. An apparatus as claimed in claim 19, wherein the at least one memory and the computer program code are configured to, with the at least one processor, cause the apparatus to configure, in case the number of HARQ processes in the configured collective pool is large enough so that HARQ RTT is long enough for local device-to-device interaction and decision needed, a cluster-specific common HARQ acknowledgement to be fed back to the serving base station, wherein cluster members which are selected to receive HARQ TB scheduled for the cluster-specific cell-level radio network temporary identifiers C-RNTI inform the cluster head device on an individual HARQ ACK/NACK, and the cluster head device them determines the cluster-specific common HARQ acknowledgement and selects the cluster members that are to send the cluster-specific common HARQ acknowledgement to the eNB, wherein allocated power budget for sending a HARQ acknowledgement is distributed and adjusted among the selected cluster members by the cluster head device.

* * * * *

UNITED STATES PATENT AND TRADEMARK OFFICE
CERTIFICATE OF CORRECTION

PATENT NO. : 9,814,094 B2
APPLICATION NO. : 14/395029
DATED : November 7, 2017
INVENTOR(S) : Vinh Van Phan Page 1 of 1

It is certified that error appears in the above-identified patent and that said Letters Patent is hereby corrected as shown below:

In the Claims

In Column 16, Line 25, Claim 1, delete "an ad-hoc network, wherein" and insert therefor -- a network comprising --.

In Column 16, Line 31, Claim 1, delete "basis" and insert therefor -- basis of --.

In Column 17, Line 10, Claim 7, delete "and further" and insert therefor -- further --.

In Column 17, Line 20, Claim 8, delete "claimed" and insert therefor -- claimed in --.

In Column 17, Line 51, Claim 13, delete "and further" and insert therefor -- further --.

In Column 18, Line 28, Claim 17, delete "basis" and insert therefor -- basis of --.

In Column 18, Line 63, Claim 20, delete "them" and insert therefor -- then --.

Signed and Sealed this
Thirteenth Day of February, 2018

Andrei Iancu
*Director of the United States Patent and Trademark Office*